United States Patent
Choi et al.

(10) Patent No.: US 10,599,323 B2
(45) Date of Patent: Mar. 24, 2020

(54) ELECTRONIC APPARATUS AND CONTROL METHOD THEREOF

(71) Applicant: SAMSUNG ELECTRONICS CO., LTD., Suwon-si (KR)

(72) Inventors: Jin-wook Choi, Suwon-si (KR); Hong-jae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 15/903,899

(22) Filed: Feb. 23, 2018

(65) Prior Publication Data

US 2018/0246630 A1    Aug. 30, 2018

(30) Foreign Application Priority Data

Feb. 24, 2017   (KR) ........................ 10-2017-0024961

(51) Int. Cl.
*G06F 3/0488* (2013.01)
*G06F 3/041* (2006.01)

(52) U.S. Cl.
CPC .......... *G06F 3/0488* (2013.01); *G06F 3/0416* (2013.01); *G06F 3/04883* (2013.01); *G06F 2203/04808* (2013.01)

(58) Field of Classification Search
CPC . G06F 2203/04104; G06F 2203/04808; G06F 3/041; G06F 3/0412; G06F 3/0416
See application file for complete search history.

(56) References Cited

U.S. PATENT DOCUMENTS

| 8,286,102 B1 * | 10/2012 | Wilensky ............ G06F 3/04845 715/782 |
| 9,851,842 B1 * | 12/2017 | Sen ..................... G06F 3/04847 |
| 10,198,177 B2 * | 2/2019 | Watanabe ............ G06F 3/0488 |

(Continued)

FOREIGN PATENT DOCUMENTS

| KR | 10-2012-0045627 A | 5/2012 |
| KR | 10-2014-0098282 A | 8/2014 |

OTHER PUBLICATIONS

International Search Report and Written Opinion dated Sep. 21, 2018 issued by the International Searching Authority in counterpart International Application No. PCT/KR2018/002265 (PCT/ISA/210 and PCT/ISA/237).

(Continued)

*Primary Examiner* — Gene W Lee
(74) *Attorney, Agent, or Firm* — Sughrue Mion, PLLC

(57) ABSTRACT

An electronic apparatus is provided. The electronic apparatus includes a display comprising a screen for displaying an image. The electronic apparatus includes a touch sensor configured to sense touches of a user on the screen. The electronic apparatus includes a controller configured to identify moving paths corresponding to the touches, determine whether the touches correspond to individual touches on a plurality of respective regions of the screen or a collective touch on a single region comprising the plurality of respective regions of the display based on the identified moving paths, and perform either at least one first function according to the individual touches on the plurality of respective regions, or a second function according to the collective touch on the single region based on the determination.

14 Claims, 14 Drawing Sheets

(56) References Cited

U.S. PATENT DOCUMENTS

| | | | |
|---|---|---|---|
| 2009/0128516 A1* | 5/2009 | Rimon | G06F 3/0412 345/174 |
| 2010/0315366 A1 | 12/2010 | Lee et al. | |
| 2011/0074710 A1* | 3/2011 | Weeldreyer | G06F 3/0481 345/173 |
| 2011/0157047 A1 | 6/2011 | Nakagawa | |
| 2012/0062489 A1 | 3/2012 | Andersson et al. | |
| 2013/0132856 A1* | 5/2013 | Binyamin | G06F 3/017 715/740 |
| 2013/0215034 A1 | 8/2013 | Oh et al. | |
| 2013/0227418 A1 | 8/2013 | Sa et al. | |
| 2013/0234960 A1* | 9/2013 | Yamamoto | G06F 3/04883 345/173 |
| 2015/0149801 A1* | 5/2015 | Vandermeijden | G06F 3/04883 713/323 |
| 2015/0205521 A1* | 7/2015 | Ding | G06F 1/1684 345/175 |
| 2015/0363102 A1 | 12/2015 | Seymour et al. | |
| 2016/0070461 A1* | 3/2016 | Herbordt | G06F 3/04883 345/178 |

OTHER PUBLICATIONS

Communication dated Oct. 9, 2019 issued by the European Patent Office in counterpart European Application No. 18757098.1.

\* cited by examiner

FIG. 1
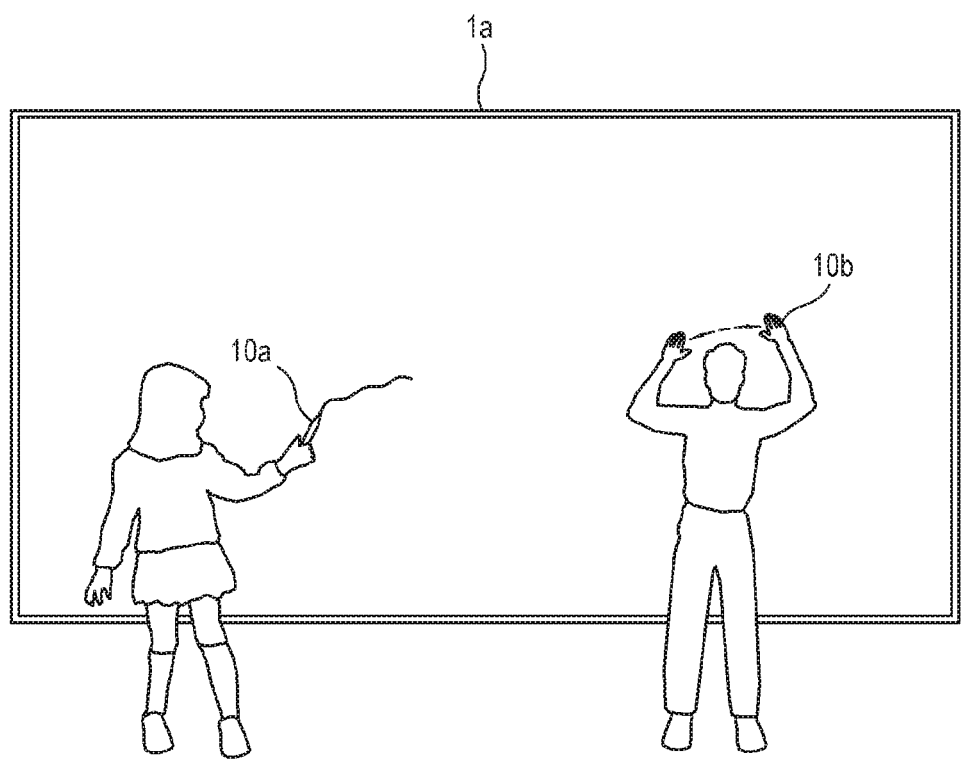
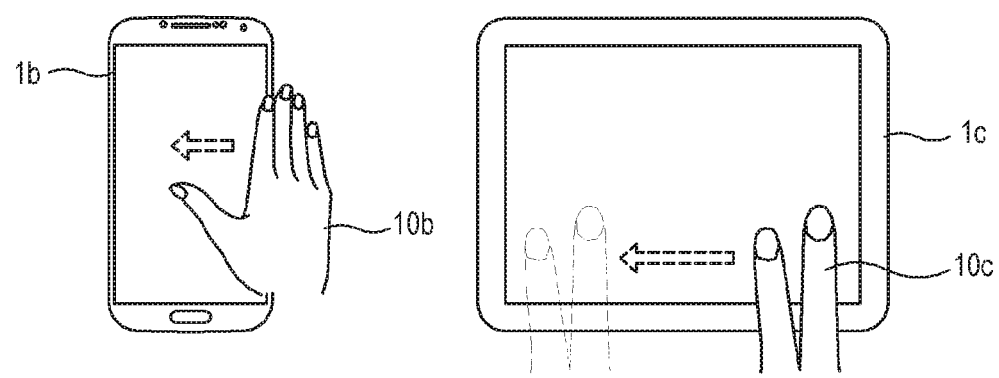

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2017-0024961, filed on Feb. 24, 2017, in the Korean Intellectual Property Office, the disclosure of which is incorporated by reference herein in its entirety.

BACKGROUND

Field

This disclosure relates to an electronic apparatus and a control method thereof, and more particularly to an electronic apparatus, which can accurately determine a region touched by a user, and a control method thereof.

Description of Related Art

Various input devices have recently been used for an electronic apparatus. As an example of an input device, a touch screen includes a touch sensor that is arranged in a display panel of an electronic apparatus and that recognizes a user's touch input. The touch screen determines a region that is touched by various mechanisms such as a user's hand, a pen, a stylus, and/or the like, and performs a function corresponding to the determined region. In terms of design, the touch screen has been in the limelight since it can eliminate the need for mechanical buttons and utilize a space previously occupied by the existing buttons. The touch screen is provided in, and utilized by, various devices such as mobile phones, smart phones, smart televisions (TV), wearable devices, electronic boards, and/or the like.

With the development of electronic apparatuses including such touch screens, various touch-based functions have been implemented, and the implemented functions have required the electronic apparatuses to more instantly and accurately sense a user's touch. To meet this requirement, touch sensors have been developed to have rapid reactivity and high sensitivity in response to a user's touch.

However, touch sensors with higher sensitivity and reactivity introduce a problem where curved portions of a hand are more likely to be recognized as individual touches in the situation where a user touches and swipes the touch screen with, for example, a palm or a set of fingers with the intention of making a single touch gesture. In this case, when the electronic apparatus implements different functions according to the areas of recognized touch regions, a user might have to more carefully touch the touch screen so as to accurately use the function, and thus the usability of the electronic apparatus is inhibited.

SUMMARY

In accordance with an aspect of the disclosure, an electronic apparatus is provided that is improved in usability by recognizing a region, in which a user's touch is sensed, and performing a function in association with the region to more accurately align with an intention of the user, and a control method thereof.

In accordance with an aspect of the disclosure, an electronic apparatus comprises a display comprising a screen for displaying an image; a touch sensor configured to sense touches of a user on the screen; and a controller configured to identify moving paths corresponding to the touches, determine whether the touches correspond to individual touches on a plurality of respective regions of the screen or a collective touch on a single region comprising the plurality of respective regions of the display based on the identified moving paths, and perform either at least one first function according to the individual touches on the plurality of respective regions, or a second function according to the collective touch on the single region based on the determination.

The controller is further configured to identify a distance between each region of the plurality of respective regions, and perform the at least one first function according to the individual touches on the plurality of respective regions when the distance between each region of the plurality of respective regions is larger than a first threshold value, or perform the second function according to the collective touch on the single region when the distance between each region of the plurality of respective regions is smaller than the first threshold value.

The controller is further configured to perform the second function according to the collective touch on the single region when the identified moving paths are towards a same direction, or perform the at least one first function according to the individual touches on the plurality of respective regions when the identified moving paths are not towards the same direction.

The controller is further configured to perform either the at least one first function according to the individual touches on the plurality of respective regions, or the second function according to the collective touch on the single region, based on moving speeds corresponding to the touches.

The controller is further configured to provide guide information for receiving another touch of the user, through the display in a test mode, and change a first threshold value based on the other touch and based on providing the guide information, wherein the first threshold value is used by the controller to identify the individual touches or the collective touch.

The guide information identifies a type of the other touch to be performed by the user.

The controller is further configured to provide a user interface that permits the user to input information identifying an intention of the other touch, and change the first threshold value based on the information identifying the intention of the other touch.

The controller is further configured to provide a user interface that permits the user to adjust a first threshold value, and wherein the first threshold value is to be used by the controller to identify the individual touches or the collective touch.

The controller is further configured to provide a user interface that permits the user to identify whether the touches correspond to the individual touches or to the collective touch.

The controller is further configured to change a first threshold value based on an input, by the user, identifying whether the touches correspond to the individual touches or to the collective touch, and wherein the first threshold value is used by the controller to identify the individual touches or the collective touch.

In accordance with an aspect of the disclosure, a method of controlling an electronic apparatus comprises displaying an image on a screen; sensing touches of a user on the screen of a display of the electronic apparatus; identifying moving paths corresponding to the touches; determining whether the touches correspond to individual touches on a plurality of respective regions of the screen or a collective touch on a single region comprising the plurality of respective regions of the display based on the identified moving paths; and performing either at least one first function according to the individual touches on the plurality of respective regions, or a second function according to the collective touch on the single region based on the determination.

The method further comprises identifying a distance between each region of the plurality of respective regions, and performing the at least one first function according to the individual touches on the plurality of respective regions when the distance between each region of the plurality of respective regions is larger than a first threshold value, or performing the second function according to the collective touch on the single region when the distance between each region of the plurality of respective regions is smaller than the first threshold value.

The method further comprises performing the second function according to the collective touch on the single region when the identified moving paths are towards a same direction, or performing the at least one first function according to the individual touches on the plurality of respective regions when the identified moving paths are not toward same direction.

The method further comprises performing either the at least one first function according to the individual touches on the plurality of respective regions, or the second function according to the collective touch on the single region, based on moving speeds corresponding to the touches.

The method further comprises providing guide information for receiving another touch through the display in a test mode; and changing a first threshold value based on a touch input, by the user, based on the guide information, wherein the first threshold value is to be used to identify the individual touches or the collective touch.

The guide information identifies a type of the other touch to be performed by the user.

The method further comprises providing a user interface that permits the user to input information identifying an intention of the other touch; and changing the first threshold value based on providing the guide information and receiving the information identifying the intention of the other touch.

The method further comprises providing a user interface that permits the user to adjust a first threshold value, wherein the first threshold value is to be used to identify the individual touches or the collective touch.

The method further comprises providing a user interface that permits the user to input information identifying whether the touches correspond to the individual touches or to the collective touch.

The method further comprises changing a first threshold value based on the information that identifies whether the touches correspond to the individual touches or to the collective touch, wherein the first threshold value is to be used to identify the individual touches or the collective touch.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates an electronic apparatus according to an embodiment;

DETAILED DESCRIPTION

Figure 2:
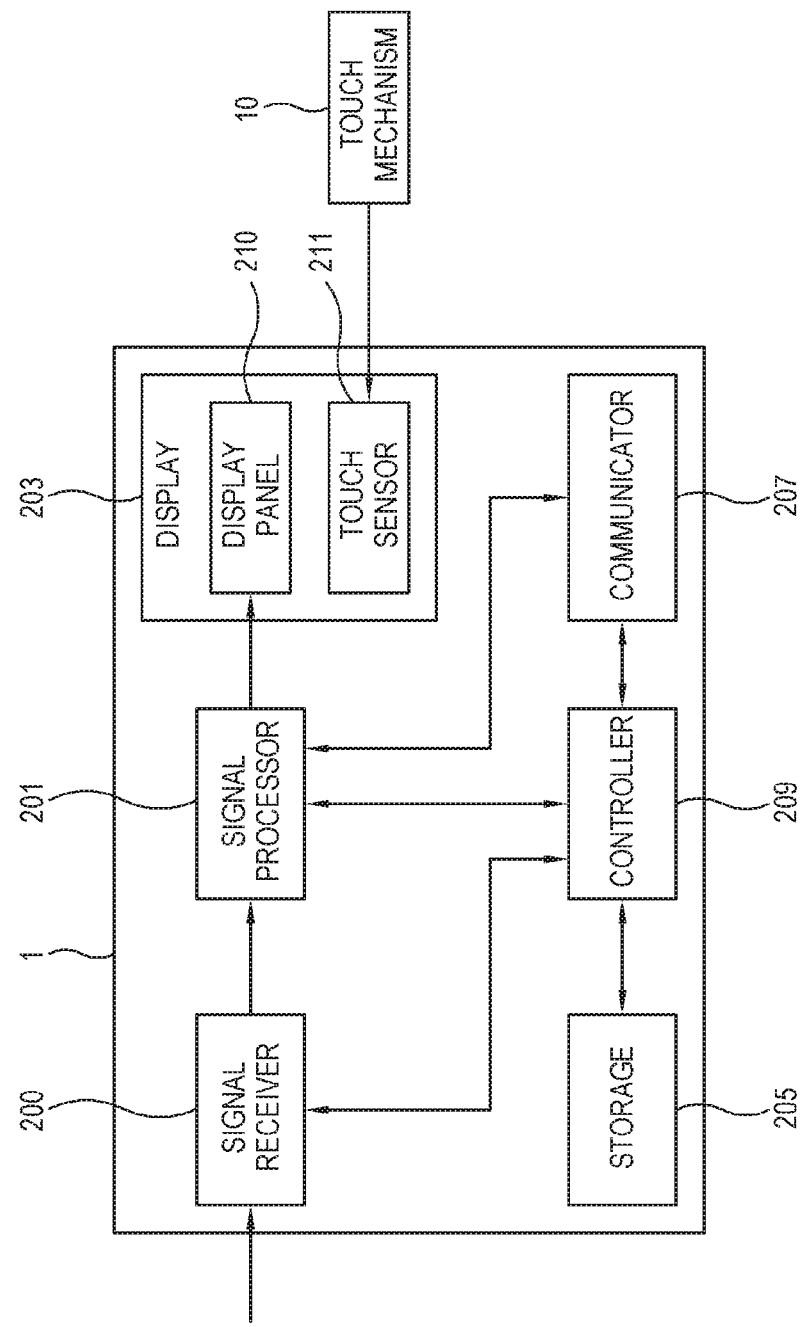
FIG. 2 is a block diagram of the electronic apparatus according to an embodiment.

Below, embodiments will be described in detail with reference to the accompanying drawings. The following descriptions of the embodiments are made by referring to elements shown in the accompanying drawings, in which like numerals may refer to like elements having substantially the same functions.

In the description of the embodiments, an ordinal number used in terms such as a first element, a second element, etc., is employed for describing a variety of elements, and the terms are used for distinguishing between an element and another element. Therefore, the meanings of the elements are not limited by the terms, and the terms are also used for explaining the corresponding embodiment without limiting the disclosure.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The embodiments described below may be applied to an electronic apparatus capable of receiving a touch input via an input mechanism such as a user's finger(s), hand(s), a touch pen, a stylus, an input device, and/or the like. As an example of the electronic apparatus according to an embodiment, an electronic board having a large format display panel will be described, but the disclosure is not limited thereto. For example, the electronic apparatus according to an embodiment may include a smart phone, a personal digital assistant (PDA), a personal computer (PC), a laptop computer, a TV, an electronic frame, a smart watch, an advertising board, a wearable device, a pair of smart glasses, and/or the like.

FIG. 1 illustrates an electronic apparatus according to an embodiment. As shown in FIG. 1, an electronic apparatus 1a, 1b and/or 1c displays an image via a display (as shown by reference number 203 of FIG. 2), and performs various functions in response to a command issued by a user. Here, a user's command may be received in the form of a touch input. The electronic apparatus 1a, 1b and/or 1c may sense a touch input provided via an input mechanism (shown as touch mechanism 10 in FIG. 2) such as a touch pen 10a, a hand 10b, a finger(s) 10c, and/or the like, via a display panel on which an image is displayed.

The electronic apparatus 1a, 1b and/or 1c may be an electronic board, a smart phone, a tablet PC, and/or the like, as described above, but the embodiments described herein are not limited thereto. The electronic apparatus 1a, 1b and/or 1c performs a function corresponding to a touch on a touched region based on a user's touch. For example, the electronic apparatus 1a, 1b and/or 1c may display a pointer at a position touched with a user's finger 10c, draw or erase an item (e.g., a line, a figure, etc.), select a graphical user interface (GUI) menu corresponding to the touched position, and/or the like.

As a particular example, the electronic apparatus 1a, 1b and/or 1c may draw a line corresponding to the touched position in the situation where an area of the recognized region is a narrow region corresponding to the finger 10c or the touch pen 10a. As another example, the electronic apparatus 1a, 1b, and/or 1c may perform other functions (e.g., an erasing function with an eraser) based on the area of the recognized region being a wide region corresponding to a palm 10b of the user.

As described elsewhere herein, the electronic apparatus 1a, 1b, and/or 1c may determine that a touch is input to a single region including a plurality of respective regions (hereinafter, also referred to as a "collective touch") based on various factors such as a distance between the regions, moving paths of touches on the regions, etc., despite inputs being made by touching the plurality of regions with a curved portion of the palm 10b. Alternatively, the electronic apparatus 1a, 1b, and/or 1c may determine that touches are input to the plurality of respective regions (hereinafter, also referred to as "individual touches") based on moving paths despite a distance between the plurality of touched regions not satisfying a threshold (e.g., being less than a threshold), thereby permitting the plurality of regions to be regarded as a single region. That is, the electronic apparatus 1a, 1b and/or 1c according to an embodiment can recognize a touch and perform a corresponding function to more accurately align with a user's intention. Thus, the electronic apparatus 1a, 1b, and/or 1c according to an embodiment offers improved usability.

Below, details of the electronic apparatus 1a, 1b, and/or 1c will be described.

FIG. 2 is a block diagram of an electronic apparatus 1 according to an embodiment.

The electronic apparatus 1 includes a display 203 including a display panel 210, and a touch sensor 211 that is configured to sense a touch input provided via a touch mechanism 10. The electronic apparatus 1 may further include at least one of a signal receiver 200, a signal processor 201, a storage 205, a communicator 207, and/or a controller 209. The configuration of the electronic apparatus 1 shown in FIG. 2 is an example, and the electronic apparatus 1 according to an embodiment may include other elements other than, or in addition to, the elements shown in FIG. 2. That is, the electronic apparatus 1 according to an embodiment may include more elements than as shown in FIG. 2, or include fewer elements than as shown in FIG. 2.

In situations where the electronic apparatus 1 is configured to receive and provide a broadcast signal, the electronic apparatus 1 (e.g., a TV, a set-top box (STB), a PC, and/or the like) may include the signal receiver 200. The signal receiver 200 receives a video signal from an external source. The signal receiver 200 may include a tuner for receiving the video signal. The tuner may be tuned to a certain channel selected by a user among a plurality of channels through which broadcast signals are received. The signal receiver 200 may receive a video signal from an image processing device (e.g., an STB, a digital versatile disc (DVD) player, a PC, etc.), a mobile device (e.g., a smart phone, a wearable device, a PDA, etc.), a server via the Internet, and/or the like.

The signal processor 201 applies a signal processing technique to an image signal received by the receiver 200 and outputs the processed image signal to the display 203 to permit the display 203 to display an image. The signal processing technique implemented in the signal processor 201 may include, for example, a demultiplexing technique for dividing an input transport stream including an image signal into sub-streams of a video signal, an audio signal, and appended data; a de-interlacing technique for converting an interlaced-type video signal into a progressive-type video signal; a scaling technique for adjusting a resolution of a video signal; a noise reduction technique for improving quality of an image; a detail enhancement technique; a frame refresh rate conversion technique; and/or the like.

The display 203 displays an image based on the video signal processed by the signal processor 201, and senses a user's touch input as described above. The display 203 may include a display panel 210 configured to display an image, and the touch sensor 211 configured to sense a touch input provided via a touch mechanism 10. The display panel 210 may include, for example, various display types such as a liquid-crystal display (LCD), a plasma display, a light-emitting diode (LED) display, an organic light-emitting diode (OLED) display, a surface-conduction electron-emitter display (SED), a carbon nano-tube (CNT) display, a nano-crystal display, and/or the like.

When the display panel 210 is an LCD, the display 203 includes a liquid-crystal display panel 210, a backlight unit for emitting light to the liquid-crystal display panel 210, a panel driving substrate for driving the liquid-crystal display panel 210, etc. The display 203 may include a self-emissive OLED display panel 210 that does not include the backlight unit.

The touch sensor 211 senses a touch provided via a touch mechanism 10 such as a user's pen, a hand, a finger, and/or the like, that interacts with the display panel 210. The touch sensor 211 may be provided on the entire surface of the display 203 on which an image is displayed, a portion of the display 203, and/or the like. The touch sensor 211 may have a structure in which a transparent electrode is arranged in a matrix form on the display panel 210 and includes a capacitive sensing circuit. The touch sensor 211 may include a flexible printed circuit board (FPCB), and/or the like, having a general feature format (GFF) or G2 structure using the transparent electrode such as indium tin oxide (ITO), metal mesh, an silver nano-wire, etc,. or a structure in which a conductive material is arrayed using an opaque and flexible film as a substrate. However, the structure of the touch sensor 211 according to an embodiment is not limited to the capacitive type. For example, the touch sensor 211 may include a resistive type having a structure, in which two substrates (e.g., an upper and lower substrate) are joined together, that generates an electric signal when the upper and lower substrates are connected by pressing the upper substrate, and thus sensing a position based on the electric signal. Alternatively, the touch sensor 211 may include an infrared (IR) type that detects coordinates at which light is blocked, a surface acoustic wave type using a propagating characteristic of sound like the IR type, and/or another type.

The storage 205 is configured to store data for use by the electronic apparatus 1. For example, the storage 205 may store software (e.g., a program) containing one or more instructions that are stored in a machine-readable (e.g., computer-readable) storage medium (e.g., internal memory) or external memory. The storage 205 may be provided as a nonvolatile memory (e.g. a writable read only memory (ROM)) in which data is retained and variations are reflected even though the electronic apparatus 1 is powered off. That is, the storage 205 may include one of a flash memory, an erasable programmable read only memory (EPROM), and an electrically erasable programmable read only memory (EEPROM).

The storage 205 may include a volatile memory which retains data only when the electronic apparatus 1 is powered on. That is, the storage 205 may include either of a dynamic random access memory (DRAM) or a static random access memory (SRAM) which is capable of writing and reading information and has a faster reading or writing speed than that of the nonvolatile memory.

The communicator 207 is configured to communicate with an external device. The communicator 207 may correspond with the types of the external device or the electronic apparatus 1. For example, the communicator 207 includes a connection part for wired communication, and the connection part may transmit/receive a signal/data complying with various standards, such as high definition multimedia interface (HDMI), HDMI-consumer electronics control (CEC), universal serial bus (USB), a Component, and/or the like, and includes at least one connector or terminal corresponding to each of the standards. The communicator 207 may perform wired communication with a plurality of servers through a wired local area network (LAN), a cellular network, a wide area network (WAN), a metropolitan area network (MAN), a cloud computing network, and/or the like.

The communicator 207 may include various elements in accordance with the design of the electronic apparatus 1 in addition to the connection part including the connector or terminal for the wired communication. For example, the communicator 207 may include a radio frequency (RF) circuit for transmitting and receiving an RF signal to perform wireless communication with the external device, and perform functions corresponding to a communication protocol, including at least one of wireless fidelity (Wi-Fi), Bluetooth, Zigbee, ultra-wide band (UWB), wireless USB, near field communication (NFC), and/or the like.

The controller 209 performs control for operating general elements of the electronic apparatus 1. The controller 209 may include a control program for implementing such control, a nonvolatile memory in which the control program is installed, a volatile memory to which the installed control program is at least partially loaded, and at least one microprocessor or central processing unit (CPU) for executing the loaded control program. The control program may include program(s) in the form of at least one among a basic input/output system (BIOS), a device driver, an operating system (OS), a firmware, a platform, and an application program. According to an embodiment, the application program may be previously installed or stored in the electronic apparatus 1 when the electronic apparatus 1 is manufactured, or installed later in the electronic apparatus 1 based on data of an application program received from an external source. The data of the application program may be downloaded, for example, from an external server to the electronic apparatus 1.

According to an embodiment, the controller 209 determines a distance between a plurality of regions in the situation where a user's touches are sensed in the plurality of regions on the display panel 210, and performs a function corresponding to a touch of a single region including the plurality of regions in which the distance between the plurality of regions does not satisfy (e.g., is less than or equal to) a threshold value based on determination results, or a function corresponding to each individual touch of the plurality of regions in which the distance between the plurality of regions satisfies the threshold value (e.g., is greater than the threshold value).

The controller 209 may perform a function corresponding to a touch of the single region, and determine a moving path of the touch sensed on the plurality of regions within the single region after the touch is moved by a predetermined distance. The controller 209 may cancel the function performed in the single region based on the determination results, and perform the function based on the moving path including the plurality of regions.

The controller 209 may perform a function corresponding to a touch on each of the regions, and determine a moving path of a touch sensed on the plurality of regions after the touch is moved by a predetermined distance. The controller 209 may cancel the function performed based on the touch associated with the plurality of regions based on the determination results, and perform the function based on the moving path involving the single region including the plurality of regions. Thus, the controller 209 may perform a function based on the moving path and/or the distance between the plurality of regions, thereby more accurately and efficiently aligning a function with a user's intention.

The controller 209 may determine a moving path of a touch on a plurality of regions. The controller 209 may perform a function corresponding to a touch on each of the regions, or perform a function corresponding to the touch on a single region including the plurality of regions, based on the determined moving path of the touch on the plurality of regions.

Figure 3:
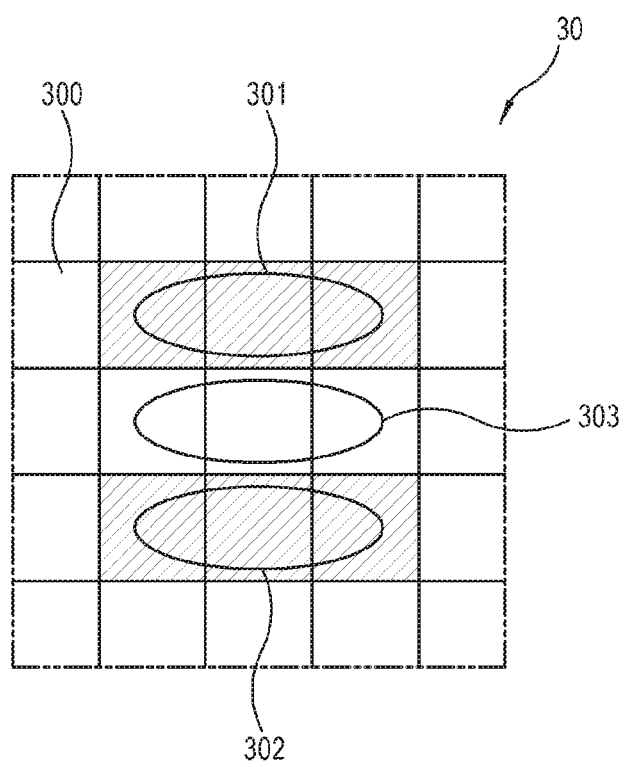
FIG. 3 illustrates a sensing matrix for recognizing a touch according to an embodiment.

FIG. 3 illustrates a sensing matrix for recognizing a touch according to an embodiment.

The touch sensor 211 determines (e.g., senses, detects, etc.) a user's touch through a sensing matrix 30 including a plurality of sensing regions 300. A single sensor may include a single sensing region 300, and sense whether the sensing region 300 is being touched. Alternatively, a plurality of sensors may correspond to a single sensing region 300, and sense whether the sensing region 300 is being touched. In addition, touch sensor 211 may sense the touched regions 301 and 302 among the plurality of sensing regions 300. That is, each sensing region 300 of the sensing matrix 30 refers to the smallest unit capable of being sensed by the touch sensor 211 to determine whether the sensing region 300 is being touched.

When the touched regions 301 and 302, among the plurality of sensing regions 300, are spaced apart at a distance greater than a blank region 303, including at least one untouched sensing region 300, the controller 209 determines each of the touched regions 301 and 302 as individual regions. The controller 209 determines the sensing regions 300, which are adjacent to the touched regions 301 and 302, as a single region. The controller 209, according to an embodiment, determines whether a touch is made in association with the plurality of regions 301 and 302 or a single region including the plurality of regions 301 and 302 based on the distance between the regions 301 and 302, the moving path of the touches, etc. when the touches are respectively sensed on the regions 301 and 302.

Figure 4:
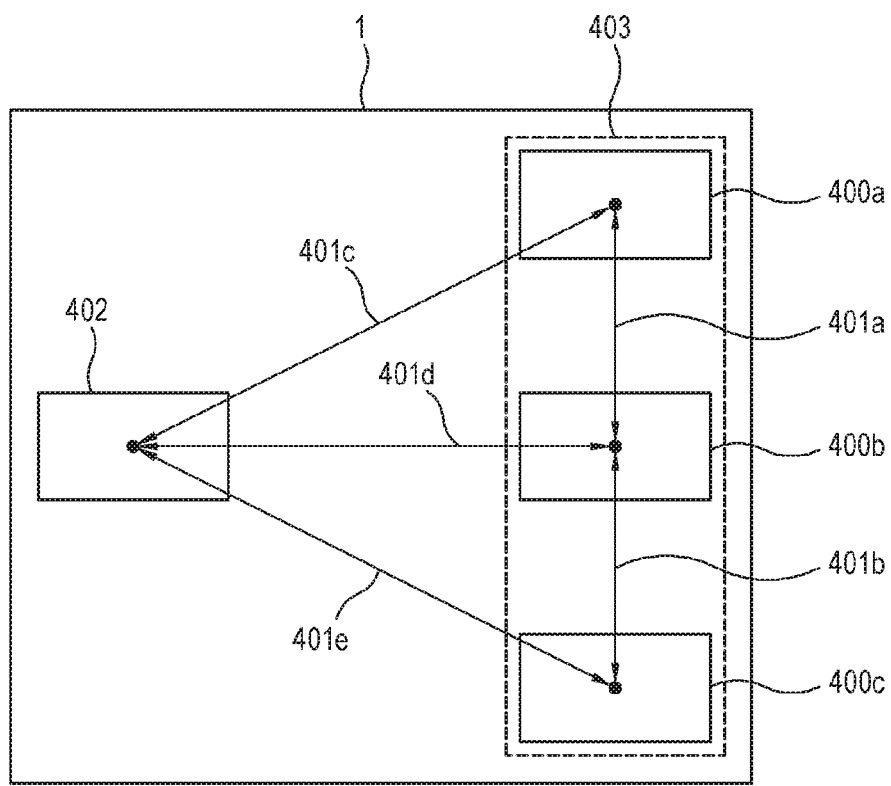
FIG. 4 illustrates an example in which a recognized touch region is changed based on distances between a plurality of touched regions according to an embodiment.

FIG. 4 illustrates an example in which a recognized touch region is changed based on distances between a plurality of touched regions according to an embodiment.

When a user touches the display panel 210 of the electronic apparatus 1, the controller 209 determines whether there are touches on a plurality of regions based on positions of the touches on the sensing matrix 30 sensed by the touch sensor 211, and determines the distance between the plurality of touched regions in the situation where there are touches on the plurality of regions. The distance between the plurality of regions refers to a distance between the centers of the regions, but is not limited thereto. For example, the distance between the plurality of regions may include a distance between the edges of the regions, a distance between points that are biased in a direction such as a leftward or rightward direction of the regions, a distance between points randomly selected in the regions, and/or the like. In situations where the distances between a set of regions, among the plurality of regions, do not satisfy the threshold value, the controller 209 determines that the touch is performed with regard to a single region including the set of regions. Alternatively, in situations where the distances satisfy the threshold value, the controller 209 determines that the touches correspond to separate touches on separate regions. In FIG. 4, the plurality of regions 400a, 400b, 400c, and 402 are illustrated as having quadrangular shapes for convenience, but should not construed as limiting the form of the touch or the form of recognizing the touch to the quadrangular shape.

As an example, assume that a user touches the region 400a and the region 400b (or the region 400b and the region 400c), respectively. In this case, the controller 209 may determine that the distance 401a between the region 400a and the region 400b (or the distance 401b between the region 400b and the region 400c) does not satisfy the threshold value. As such, the controller 209 may generate a region 403 that includes non-touched regions between the region 400a and the region 400b (or the region 400b and the region 400c). Further, the controller 209 performs a function corresponding to a touch on the generated single region 403.

As another example, assume that the user touches the region 400a and the region 402, respectively. In this case, the controller 209 determines that a distance 401c between the region 400a and the region 402 satisfies the threshold value, and determines that the touches correspond to separate touches occurring in the separate regions 400a and 402, respectively. Further, the controller 209 performs a function(s) corresponding to the separate touches and the separate regions 400a and 402. The controller 209 may determine similar touches and perform similar functions in the situation where the user touches the region 400b and the region 402 (e.g., because the distance 401d satisfies the threshold value), where the user touches the region 400c and the region 402 (e.g., because the distance 401e satisfies the threshold value), and/or another situation where the distance between regions satisfies the threshold value.

Figure 5:
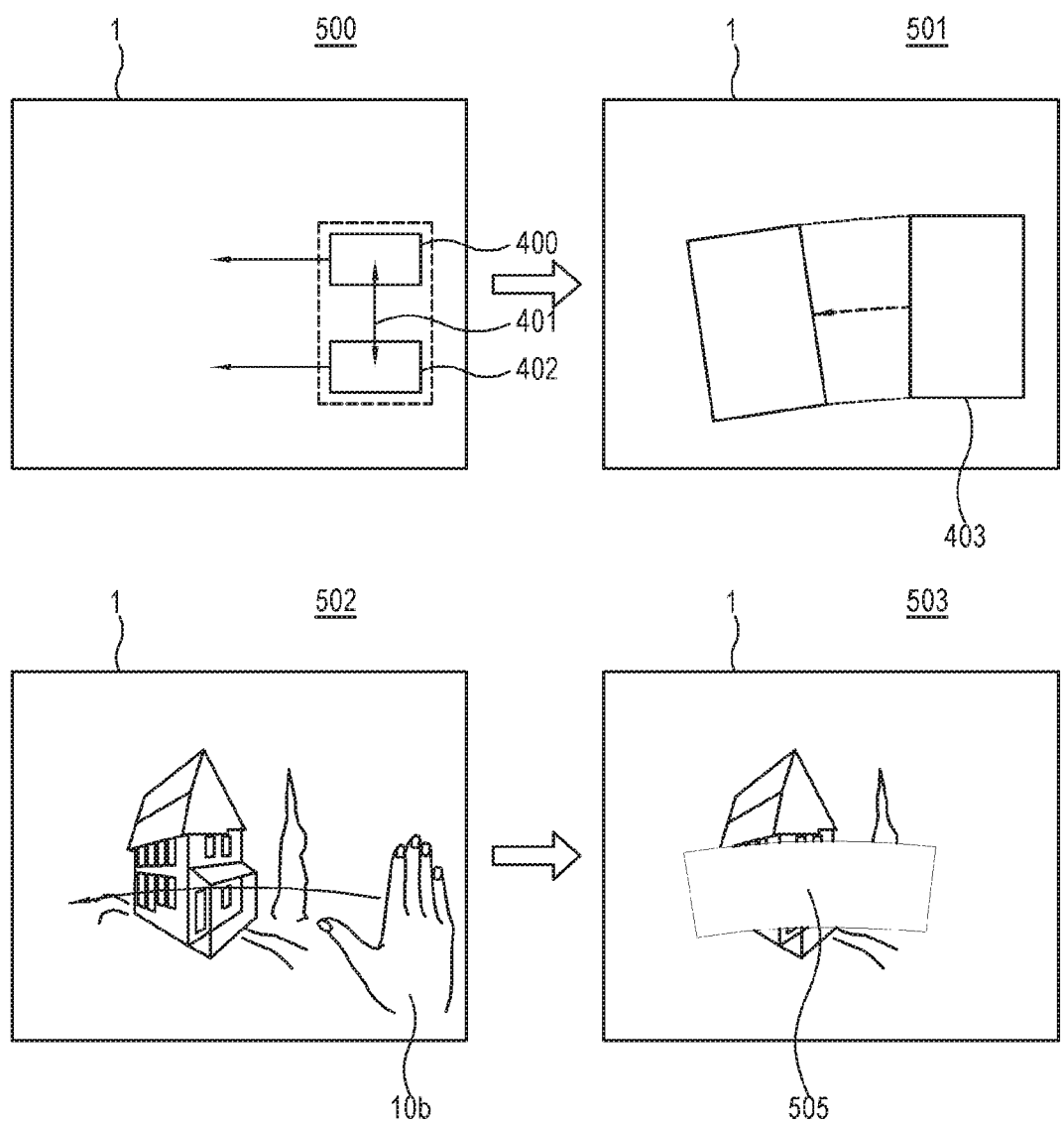
FIG. 5 illustrates an example in which a function is implemented corresponding to a single region including a plurality of touched regions according to an embodiment.

FIG. 5 illustrates an example in which a function is implemented corresponding to a single region including a plurality of touched regions according to an embodiment.

As shown by reference number 500, assume that the touch sensor 211 senses touches on the region 400 and the region 402, respectively. In this case, the controller 209 determines the distance 401 between the region 400 and the region 402. In the situation where the distance 401 does not satisfy the threshold value, the controller 209 generates the single region 403, and determines that the touched region is the generated single region 403.

As shown by reference number 501, the controller 209 may perform a function corresponding to a user's touch in association with the generated single region 403 in accordance with the moving path of the touch after generating the single region 403. The function performed in this case may include various functions such as, for example, an eraser function, a screen capture function, a line drawing in a wide region function, a page turning function, and/or the like.

As shown by reference number 502, the controller 209 may sense a touch that is made with a user's hand 10b, and generate a single region based on a distance(s) between separate touch regions of the user's hand 10b not satisfying the threshold value. As shown by reference number 503, the controller 209 may perform an eraser function 505 that is performed using the single generated region.

Figure 6:
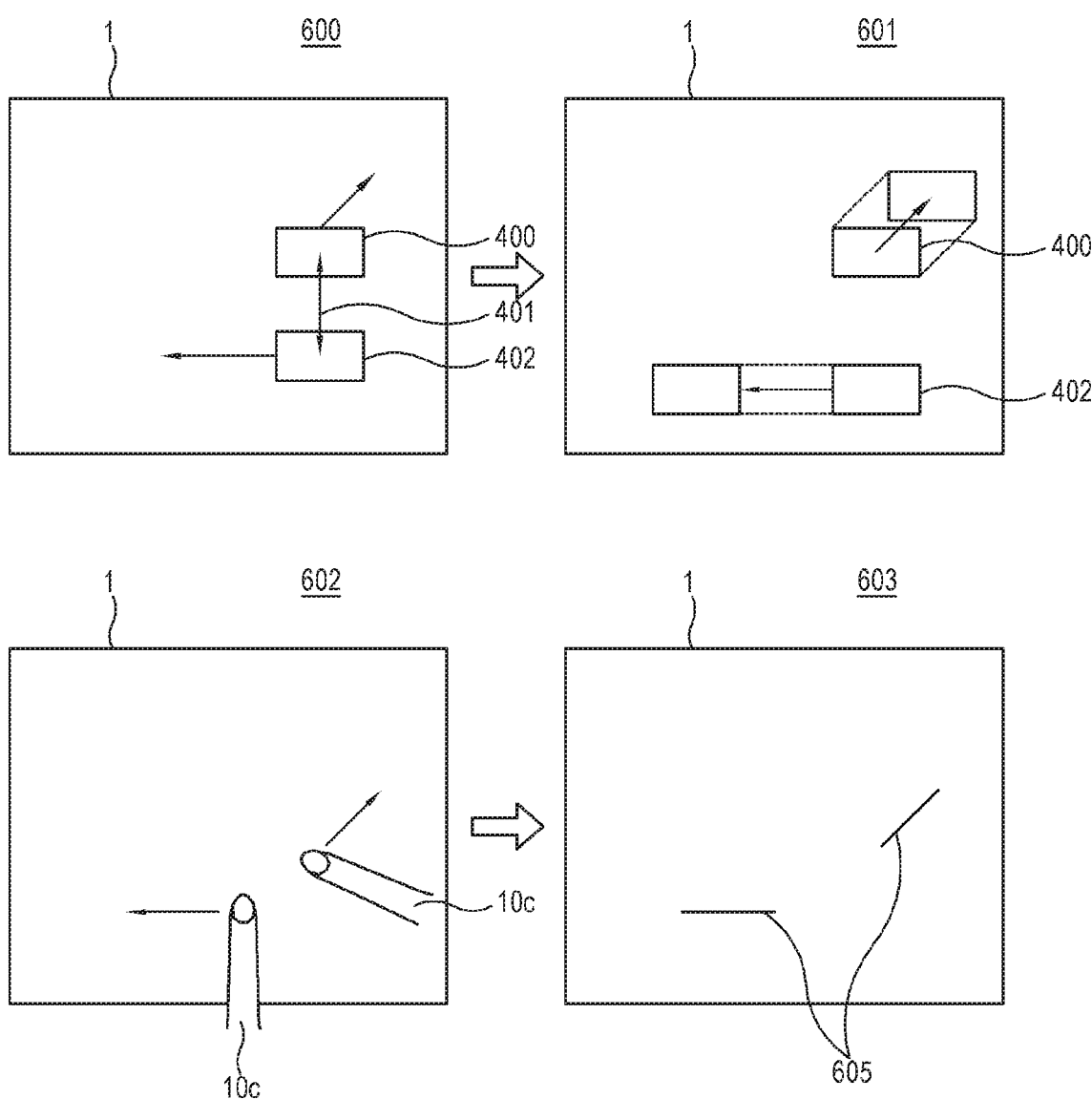
FIG. 6 illustrates an example in which a function is implemented corresponding to each touch on a plurality of touched regions according to an embodiment.

FIG. 6 illustrates an example in which a function is implemented corresponding to each touch on a plurality of touched regions according to an embodiment.

As shown by reference number 600, the touch sensor 211 senses touches on the region 400 and the region 402, respectively. Further, the controller 209 determines the distance 401 between the region 400 and the region 402. In the situation where the distance 401 between the region 400 and the region 402 satisfies (e.g., exceeds) the threshold value, the controller 209 determines that the touches are respectively made on the region 400 and the region 402.

As shown by reference number 601, the controller 209 performs functions that correspond to the moving paths of the user's touches on the region 400 and the region 402, respectively. The functions performed in this case may include various functions such as, for example, pointer moving, icon dragging, line drawing on the region 400 and the region 402, and/or the like.

As further shown in FIG. 6, and by reference number 602, the controller 209 may sense a touch by a user's finger 10c and another touch by another finger 10c of the user, and determine that the touches correspond to separate touches based on a distance between the separate touches satisfying a threshold value. In this case, and as shown by reference number 603, the controller 209 may perform separate line drawing functions 605 based on the touches, and based on the distance between the touches satisfying the threshold value.

Figure 7:
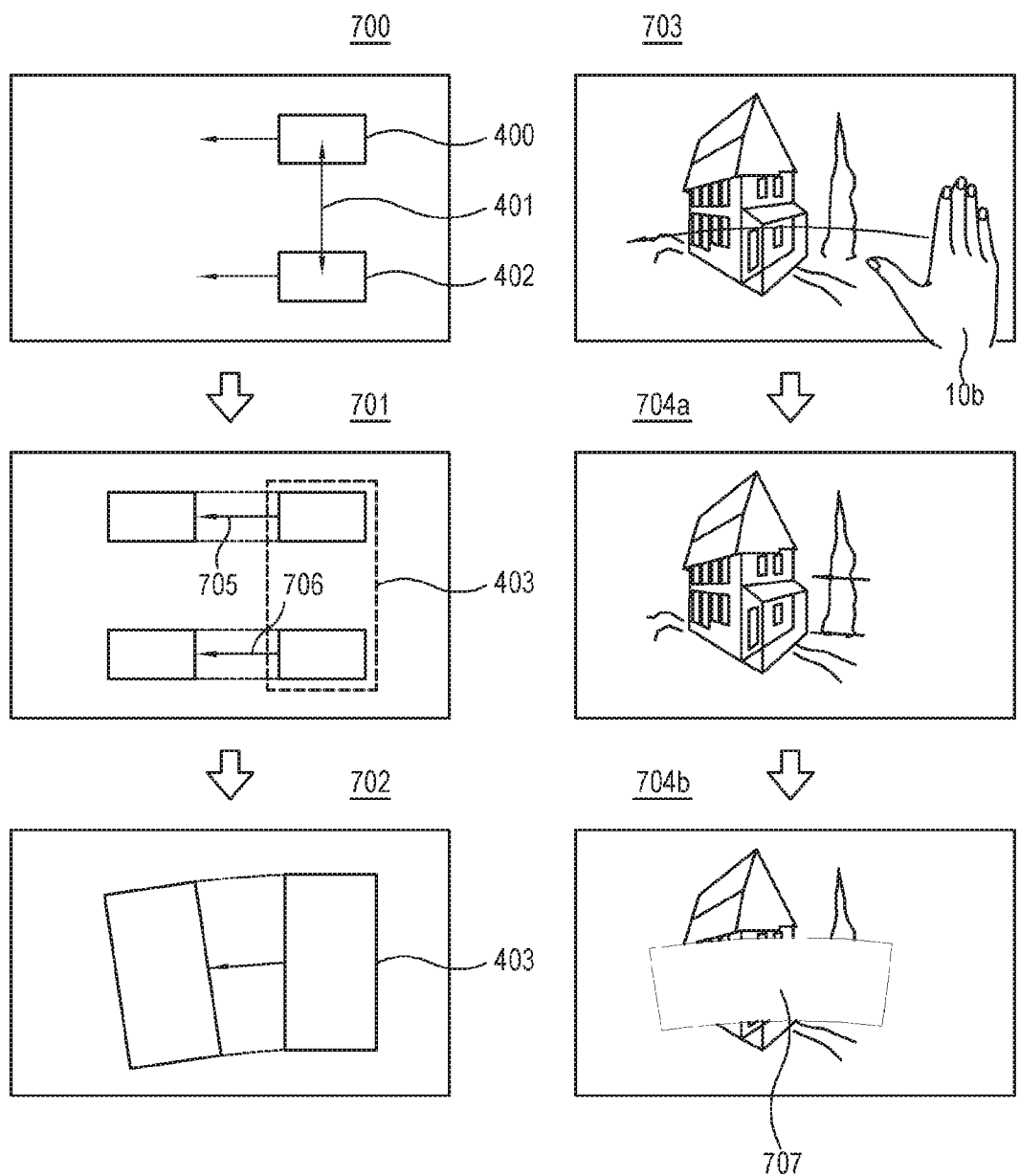
FIG. 7 illustrates an example in which a function is implemented corresponding to a single touch including a plurality of regions by additionally taking a moving path into account despite a distance between a plurality of touched regions satisfying a threshold value according to an embodiment.

FIG. 7 illustrates an example in which a function is implemented corresponding to a single touch including a plurality of regions by additionally taking a moving path into account despite a distance between the plurality of touched regions satisfying a threshold value according to an embodiment.

As shown by reference number 700, assume that a user touches the region 400 and the region 402, respectively. Further, assume that the distance 401 between the region 400 and the region 402 satisfies a first threshold value. In this case, the controller 209 senses respective touches on the region 400 and the region 402, and determines that the region 400 and the region 402 are respectively touched based on the distance 401 between the region 400 and the region 402 satisfying the first threshold value.

As shown by reference number 701, assume that the touches on the region 400 and the region 402, respectively, are moved by a predetermined distance. The controller 209 additionally takes the moving path 705 and the moving path 706 of the respective touches into account in the situation where the distance 401 between the region 400 and the region 402 satisfies the first threshold value, and does not satisfy a second threshold value that is greater than the first threshold value (e.g., where the distance 401 includes a value that is between the first threshold value and the second threshold value). In the situation where a difference between the moving path 705 and the moving path 706 of the touches does not satisfy a third threshold value, the controller 209 determines that the region 400 and the region 402 correspond to the single region 403, and generates the single region 403. The difference may be determined based on distances between the moving paths, orientations of the moving paths, angles of the moving paths, coordinates of the moving paths, velocities of the touches associated with the moving paths, distances travelled by the touches associated with the moving paths, and/or the like.

As shown by reference number 702, the controller 209 performs a function corresponding to a user's touch on the single region 403. Because the touches on the region 400 and the region 402 are moved by a predetermined distance, the functions corresponding to the touches might have been previously performed along the moving path 705 and the moving path 706 along the moved distance. In this case, the controller 209 cancels the functions corresponding to the separate touches on the region 400 and the region 402 along the moving path 705 and the moving path 706, and retroactively applies a function(s) that corresponds to a single generated region 403, thereby permitting the effect of the touches initially being made in association with the single region 403 and then moved along the moving path 705 and the moving path 706. For example, the controller 209 may begin performing a line drawing function along the moving paths 705 and 706 of the touches on the region 400 and the region 402, and may subsequently perform an eraser function after determining that the touches correspond to the single region 403 and generating the single region 403 based on the moving paths 705 and 706. Alternatively, the controller 209 may not disturb the functions previously performed in association with the region 400 and the region 402, and perform another function corresponding to a touch associated with the generated single region 403 measured from the beginning of the generation of the single region 403. In addition, the controller 209 may receive information identifying a user's feedback regarding whether to maintain or cancel the functions previously performed in association with the region 400 and the region 402.

That is, in the situation where the distance 401 satisfies the first threshold value and does not satisfy the second threshold value, the electronic apparatus 1 additionally takes the moving path 705 and the moving path 706 of the respective touches into account, generates the single region 403, and performs the function in association with the single region 403, thereby implementing a function that more accurately aligns with an intent of the user.

The controller 209 additionally considers the moving paths 705 and 706 and converts the touches on the plurality of regions 400 and 402 into the touch on the single region 403. Additionally, the controller 209 may decrease the threshold value based on the user's feedback to permit additional functions to be performed in a manner that more accurately aligns with an intention of the user.

As shown by reference number 703, assume that a user performs a touch with the user's hand 10b. Reference number 704a shows an example of determining that the touch is made on the single region based on the moving path while performing the function along the moving path of the hand 10b in association with the a plurality of regions based on the distance between the plurality of regions touched with a user's hand 10b. Reference number 704b shows an example of performing an eraser function 707 in association with the single region determined based on the moving path of the touch.

Figure 8:
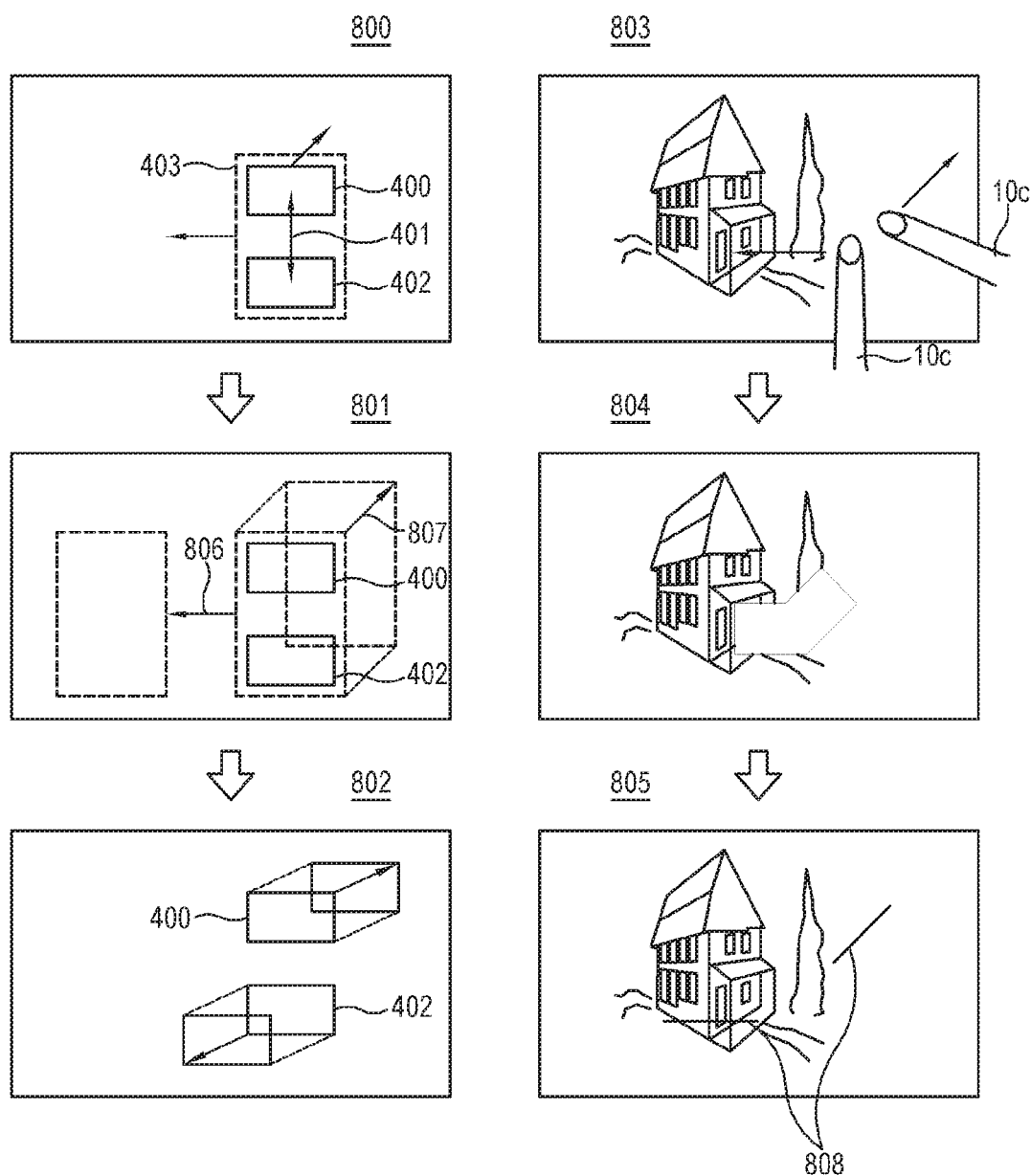
FIG. 8 illustrates an example in which a function is implemented corresponding to each region by additionally taking a moving path into account despite a distance between a plurality of touched regions not satisfying a threshold value according to an embodiment.

FIG. 8 illustrates an example in which a function is implemented corresponding to each region by additionally taking a moving path into account despite a distance between a plurality of touched regions not satisfying a threshold value according to an embodiment.

As shown in FIG. 8, and by reference number 800, assume that the controller 209 determines that separate touches are performed on the region 400 and the region 402, and that the distance 401 between the region 400 and the region 402 does not satisfy the first threshold value (e.g., is less than the first threshold value). In this case, the controller 209 generates the single region 403 because the distance 401 does not satisfy the first threshold value.

As shown by reference number 801, assume that the separate touches on the region 400 and the region 402 are moved by a predetermined distance. In this case, the controller 209 additionally takes a moving path 806 and a moving path 807 of the respective touches into account based on the distance 401 between the region 400 and the region 402 not satisfying the first threshold value and simultaneously satisfying a third threshold value that is less than the first threshold value (e.g., the distance 401 includes a value that is between the third threshold value and the first threshold value). In this case, the controller 209 determines that the touches are respectively made on the region 400 and the region 402 rather than corresponding to the single region 403 based on a difference between the moving path 806 and the moving path 807 of the respective touches.

As shown by reference number 802, the controller 209 performs a function corresponding to a user's respective touches on the region 400 and the region 402. Because the controller 209 generates the single region 403, and determines that the touches are moved in different directions by a predetermined distance, the function may be performed corresponding to the touches in association with the single region 403 in different directions along the moving path 806 and the moving path 807 until the predetermined distance. The controller 209 may cancel the function that was implemented in association with the single region 403 along the moving path 806 and the moving path 807, and retroactively apply another function to thereby permit the effect as if the touches, from the beginning of the movement(s), were made on the region 400 and the region 402, respectively, and then moved along the moving path 806 and the moving path 807. For example, the controller 209 may perform an eraser function in association with the single region 403 along the moving path 806 and the moving path 807, and then cancel the eraser function that was implemented in association with the single region 403 based on the moving path 806 and the moving path 807. Further, the controller 209 may determine that touches correspond to the region 400 and the region 402, and perform the line drawing function along the moving path 806 and the moving path 807, respectively. Alternatively, the controller 209 may not disturb the function that was previously performed in association with the single region 403, and proactively perform the function corresponding to the touches on the region 400 and the region 402 from a point of time at which the controller 209 determines that the region 400 and the region 402 are respectively touched. In addition, the controller 209 may receive information identifying a user's feedback as to whether to maintain or cancel the function performed in association with the single region 403.

That is, in situations where the distance 401 between the touched region 400 and the touched region 402 does not satisfy the first threshold value and does satisfy the third threshold value, the electronic apparatus 1 performs the functions in association with respective regions 400 and 402 by taking the moving paths 806 and 807 of each touch into account, thereby more accurately aligning a function(s) with a user's intent.

The controller 209 may convert the touch on the single region 403 into the touches on the plurality of regions 400 and 402 by additionally taking the moving paths 806 and 807 into account. Additionally, the controller 209 may decrease the threshold value based on the feedback identifying the user's approval to cancel the function performed in association with the single region 403 to thereby permit the controller 209 to perform subsequent functions in a manner that more accurately aligns with an intention of the user.

As described above, the controller 209 determines whether the respective touches on the region 400 and the region 402 are to correspond to the single region 403 or the separate regions 400 and 402, by considering the distance 401 between the touched region 400 and the touched region 402 and the moving paths 806 and 807 associated with the touches.

Alternatively, the controller 209 may determine whether a function(s) is to be implemented in association with the single region 403 or the set of regions 400 and 402, by additionally considering the moving speed of the touches, the distance 401 between the regions 400 and 402, and the moving paths 806 and 807 of the touches. For example, the controller 209 may determine that touches on the regions 400 and 402 correspond to as a single touch when the touches have substantially similar speeds despite a difference between the moving paths 806 and 807. Alternatively, the controller 209 may determine that the touches correspond to individual touches in the situation where the touches have substantially different speeds despite the touches on the regions 400 and 402 having substantially similar moving paths 806 and 807.

In addition, the touch sensor 211 may sense whether a touch is performed using a touch device, such as a touch pen, or is performed using a hand. In the situation where the touch is performed using the touch pen, the electronic apparatus 1 may determine the type of touch device of the touch pen based on a specific frequency emitted from the touch pen. In this case, when the regions 400 and 402 are touched with both the hand and the touch pen, or different types of touch pens, the controller 209 may determine that individual touches are respectively input to the plurality of regions 400 and 402 regardless of the distance 401 between the regions 400 and 402, the moving paths 806 and 807, the moving speeds, and/or the like, of the touches.

As further shown in FIG. 8, and by reference number 803, assume that a user performs a set of touches using the user's fingers 10c. As shown by reference number 804, the controller 209 may determine that a plurality of regions are touched and perform respective functions along the respective moving paths of each finger 10c in association with a single region based on the distance between the plurality of touched regions not satisfying the first threshold value. As shown by reference number 805, a line drawing function 808 is performed in association with the plurality of regions based on the moving paths of the touches, and the controller 209 removes the previously performed functions shown in association with reference number 804 because of the difference between the moving paths and despite the distance between the regions 400 and 402 not satisfying the first threshold value.

Figure 9:
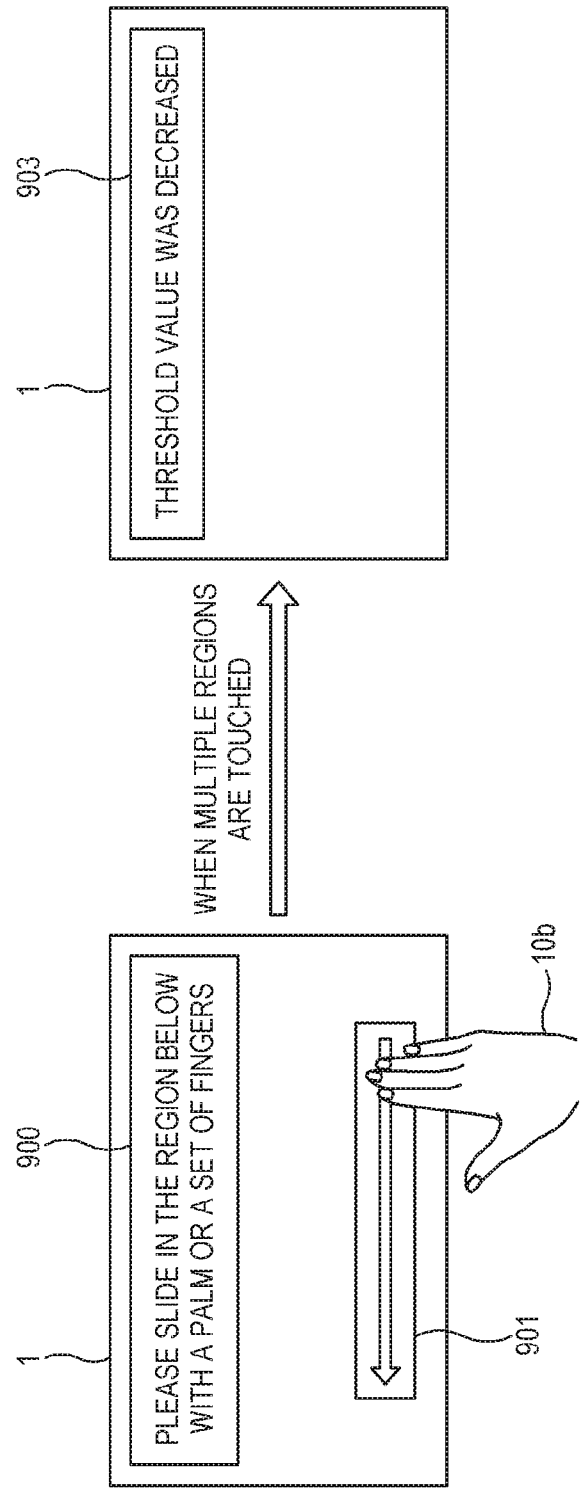
FIG. 9 illustrates an example of guide information provided to permit a user to adjust the threshold value according to an embodiment.
Figure 10:
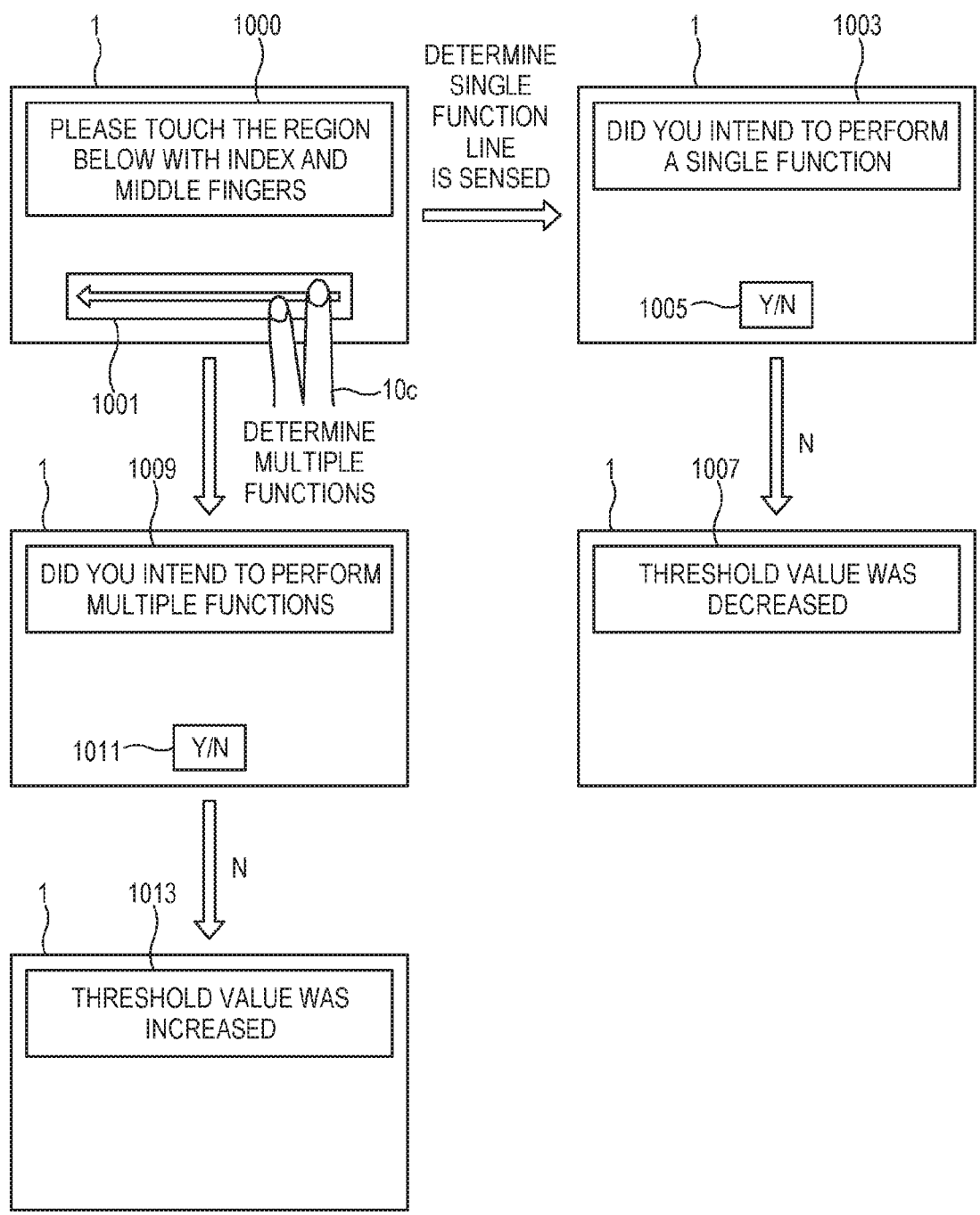
FIG. 10 illustrates an example of guide information provided to permit a user to adjust the threshold value according to an embodiment.

FIGS. 9 and 10 illustrate examples of guide information provided to permit a user to adjust the threshold value according to an embodiment.

The electronic apparatus 1 provides, for display, guide information in a test mode, receives a user's input corresponding to the guide information, provides, for display, information that solicits feedback regarding a user's intention corresponding to the input, and adjusts the threshold value in response to a user's response. The test mode may be implemented by a user's selection of a menu corresponding to the test mode, at an initial installation of the electronic apparatus 1, for a predetermined period of time after the initial installation, periodically, and/or the like. Additionally, the test mode may be implemented based on the condition in which the threshold value is changed a predetermined number of times when the moving paths or moving speeds of the touches are additionally taken into account, as described in association with FIGS. 7 and 8. Below, the test mode of the electronic apparatus 1 according to an embodiment will be described with reference to FIGS. 9 and 10.

Referring to FIG. 9, the electronic apparatus 1 provides a guide 900 for guiding a user to perform a touch or slide operation using a user's hand 10b, and provides a user interface (UI) 901 for guiding the operation. Alternatively, the guide 900 may be provided as an audio guide instead of being provided for display. Further, the guide 900 may identify a type of touch such as a preferred touch gesture, touch pattern, touch shape, touch form, and/or the like, to be performed during the slide operation. When a user performs the slide operation with the user's hand 10b along the UI 901, the controller 209 determines whether a user's touch is performed on a plurality of regions based on whether the distance between the plurality of regions satisfies a threshold value. In this embodiment, the controller 209 recognizes that the touch is made in association with a single region because the user used the hand 10b to perform the sliding operation (e.g., because the touch includes multiple touch points). In the situation where the controller 209 recognizes that the user's touch is performed in association with a plurality of regions, the controller 209 determines that the threshold value is to be adjusted. Further, the controller 209 decreases the threshold value, and displays a guide 903 identifying that the threshold value was decreased. The guide 903 may be provided as an audio guide, or may not be provided.

In the situation where the controller 209 determines that the user touches a narrow region with a finger, or the like, based on the area of the region touched by a user on the UI

901, the electronic apparatus 1 may guide the user to make another touch (e.g., to more accurately perform test mode operations).

Referring to FIG. 10, the electronic apparatus 1 provides a guide 1000 that provides information guiding a user to perform touches using two fingers 10*c*, and a UI 1001 for guiding the slide operation. In the situation where a user performs the slide operation with the fingers 10*c* along the UI 1001, the controller 209 determines whether to perform a single function or multiple functions based on the user's touches.

In the situation where the controller 209 determines to perform a single function (e.g., based on the distance between the touches not satisfying the threshold value), a guide 1003 providing information soliciting feedback whether the user intended to perform a single operation is provided. Further, a UI 1005 that permits the user to respond is provided. In the situation where the controller 209 determines, based on the user's response, that the user intended to perform a single function, the controller 209 determines that the current threshold value does not need to be modified. Alternatively, in the situation where the controller 209 determines, based on the user's response, that the user intended to perform multiple functions, the controller 209 determines that the current threshold value is to be decreased to permit the controller 209 to perform functions that more accurately align with the user's intent. In such cases, the controller 209 decreases the threshold value, and displays a guide 1007 identifying that the threshold value was decreased. The guide 1007 may be omitted or provided as an audio guide.

In the situation where the controller 209 determines to perform multiple functions based on the user's slide along the UI 1001 (e.g., because the distance between the touches satisfies the threshold value), a guide 1009 providing information soliciting feedback as to whether the user intended to perform multiple functions is provided. Further, a UI 1011 that permits the user to respond is provided. In the situation where the controller 209 determines, based on the user's response, that the user intended to perform multiple functions, the controller 209 determines that the current threshold value is not to be modified. Alternatively, in the situation where the controller 209 determines, based on the user's response, that the user intended to perform a single function, the controller 209 determines that the current threshold value is to be increased to permit the controller 209 to perform functions that more accurately align with the user's intent. As such, the controller 209 increases the threshold value, and displays a guide 1013 providing information identifying that the threshold value was increased. The guide 1013 may be omitted or given as an audio guide.

The test mode provided for adjusting the threshold value is not limited to the foregoing embodiment. The electronic apparatus 1 may identify a threshold value by guiding a user to provide additional inputs identifying the user's intention(s). Further, the UIs 901 and 1001 for guiding the touch may be provided in various forms, and thus the threshold value is more efficiently adjusted based on a user's touch in various situations to permit the controller 209 to identify a user's touch and perform operations that more accurately align with an intention of the user.

Figure 11:
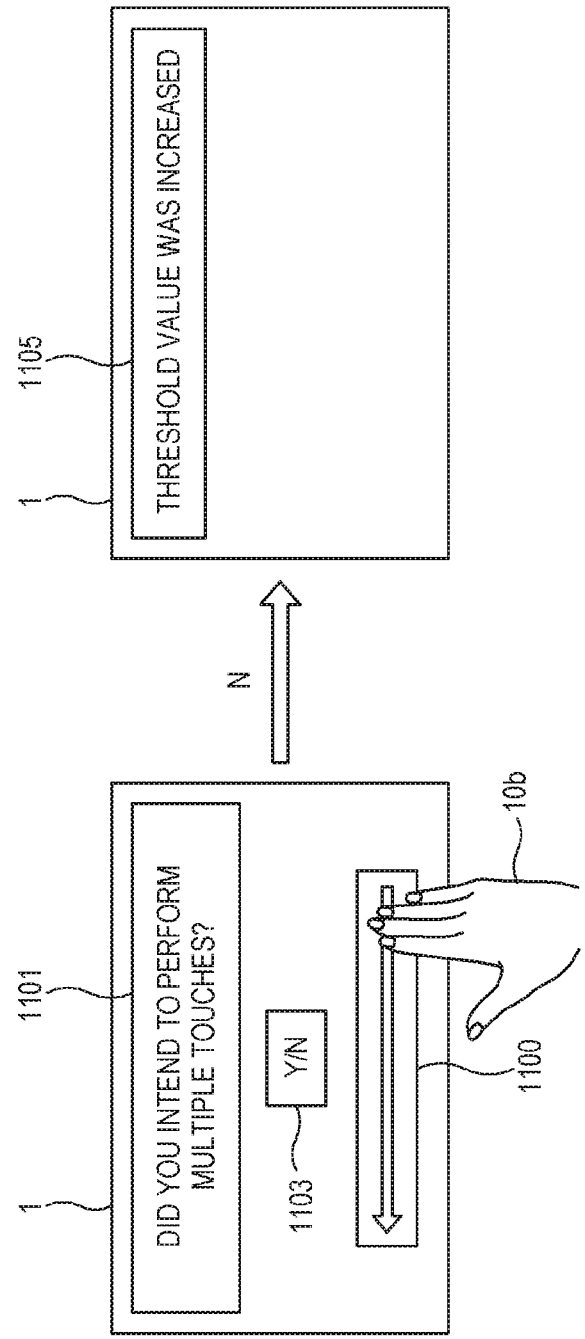
FIG. 11 illustrates an example of providing information soliciting feedback as to whether a user intends to perform a touch, and adjusting the threshold value in response to information identifying a user's response according to an embodiment.
Figure 12:
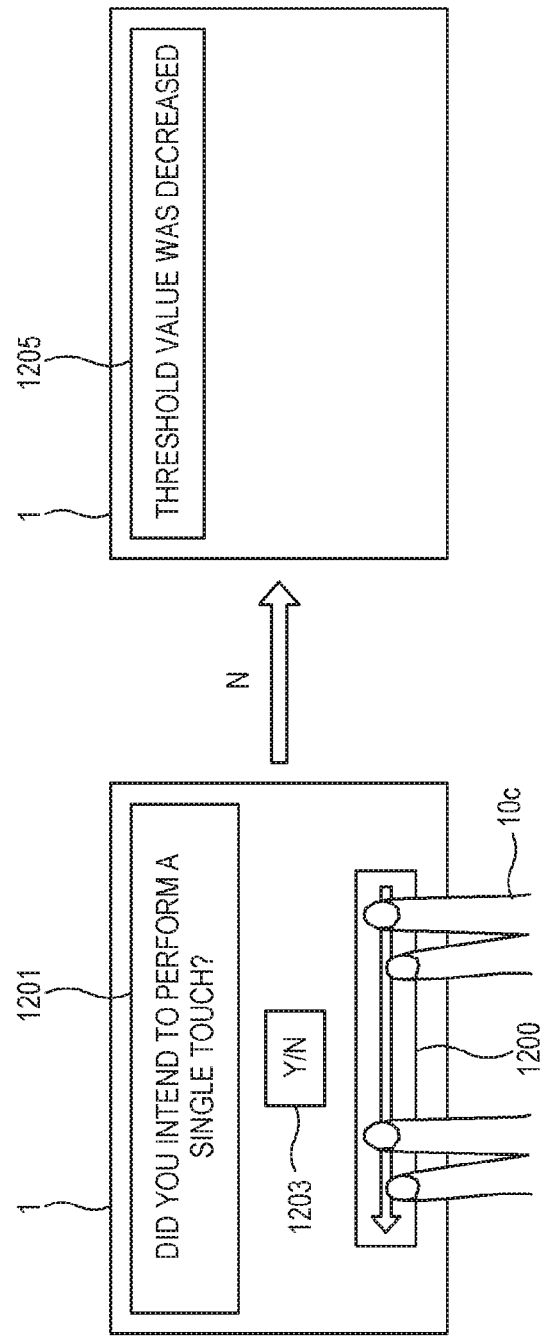
FIG. 12 illustrates an example of providing information inquiring whether a user intends to perform a touch, and adjusting the threshold value in response to information identifying a user's response according to an embodiment.

FIGS. 11 and 12 illustrate examples of soliciting feedback as to whether a user performs a touch on purpose, and adjusting the threshold value in response to a user's response according to an embodiment.

In an embodiment, the controller 209 provides information soliciting feedback as to whether an input recognized by the controller 209 matches with the user's intention. The controller 209 may provide the information at an initial installation of the electronic apparatus 1, before a predetermined period of time elapses after the initial installation, before a predetermined period of time elapses after the threshold value is changed, periodically, or based on another condition.

Referring to FIG. 11, a user performs a touch and slide operation using the user's hand 10*b*. Assume that the controller 209 determines that a plurality of regions are touched based on a distance between the regions. If the foregoing conditions are satisfied, the controller 209 may solicit a user's approval before or after performing a function corresponding to the touches on the plurality of regions. For example, when the touches on the plurality of regions have similar moving paths, the controller 209 provides a guide 1101 providing information soliciting feedback as to whether the user intended to perform multiple touches, and a UI 1103 that permits a user to respond. When the controller 209 determines, based on the user's response, that the user did not intend to perform multiple touches, the controller 209 increases the current threshold value, and provides a guide 1105 providing information identifying that the threshold value was increased. The guide 1105 providing information identifying that the threshold value was increased may be omitted, or provided as an audio guide. Further, the controller 209 may cancel a previously performed function corresponding to the plurality of regions, and perform a function corresponding to a touch input on the single region along the moving path.

Referring to FIG. 12, assume that a user performs touch and slide operations using two fingers 10*c* in association with a plurality of regions. Further, assume that the controller 209 determines that a single region is touched based on the distance between the regions not satisfying the threshold value. If the foregoing conditions are satisfied, the controller 209 may provide information soliciting feedback as to whether the user intended to perform a single touch after performing a function corresponding to the touch on the single region. For example, before a predetermined period of time elapses after changing the threshold value, a guide 1201 soliciting feedback as to whether the user intended to perform the single touch is provided, and a UI 1203 permitting the user to respond is provided. In the situation where the controller 209 determines, based on the user's response, that the user did not intend to perform a single touch, the controller 209 decreases the threshold value, and provides a guide 1205 for informing that the threshold value was decreased. The guide 1205 for informing that the threshold value was decreased may be omitted. Then, the controller 209 may cancel a function performed on the single region, and perform a function corresponding to a touch input on the plurality of regions along the moving path.

Figure 13:
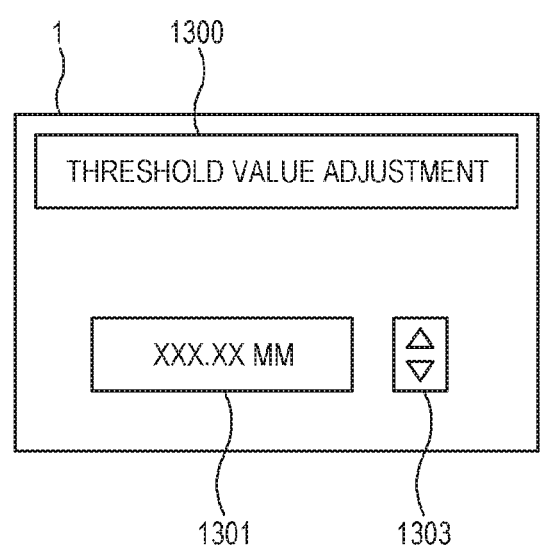
FIG. 13 illustrates an example of a user interface (UI) that permits a user to directly adjust the threshold value according to an embodiment.

FIG. 13 illustrates an example of a UI that permits a user to directly adjust the threshold value according to an embodiment.

The controller 209 may offer a UI that permits a user to directly adjust the threshold value during an initial installation of the electronic apparatus 1, in response to a user's selection, periodically, in the situation where the controller 209 determines that the threshold value is to be modified, and/or the like. The UI includes an item 1300 corresponding to the current threshold value, and an item 1301 that permits a user to enter a desired threshold value. For example, as shown, the user may enter a particular value "XXX.XX," and the controller 209 may set the threshold value to "XXX.XX" millimeters (MM). The controller 209 may provide a UI that permits a user to directly input a numerical value for selecting the threshold value. Additionally, or alternatively, the controller 209 may provide a UI item 1303 that permits a user to increase or decrease a current threshold value by a particular amount.

Figure 14:
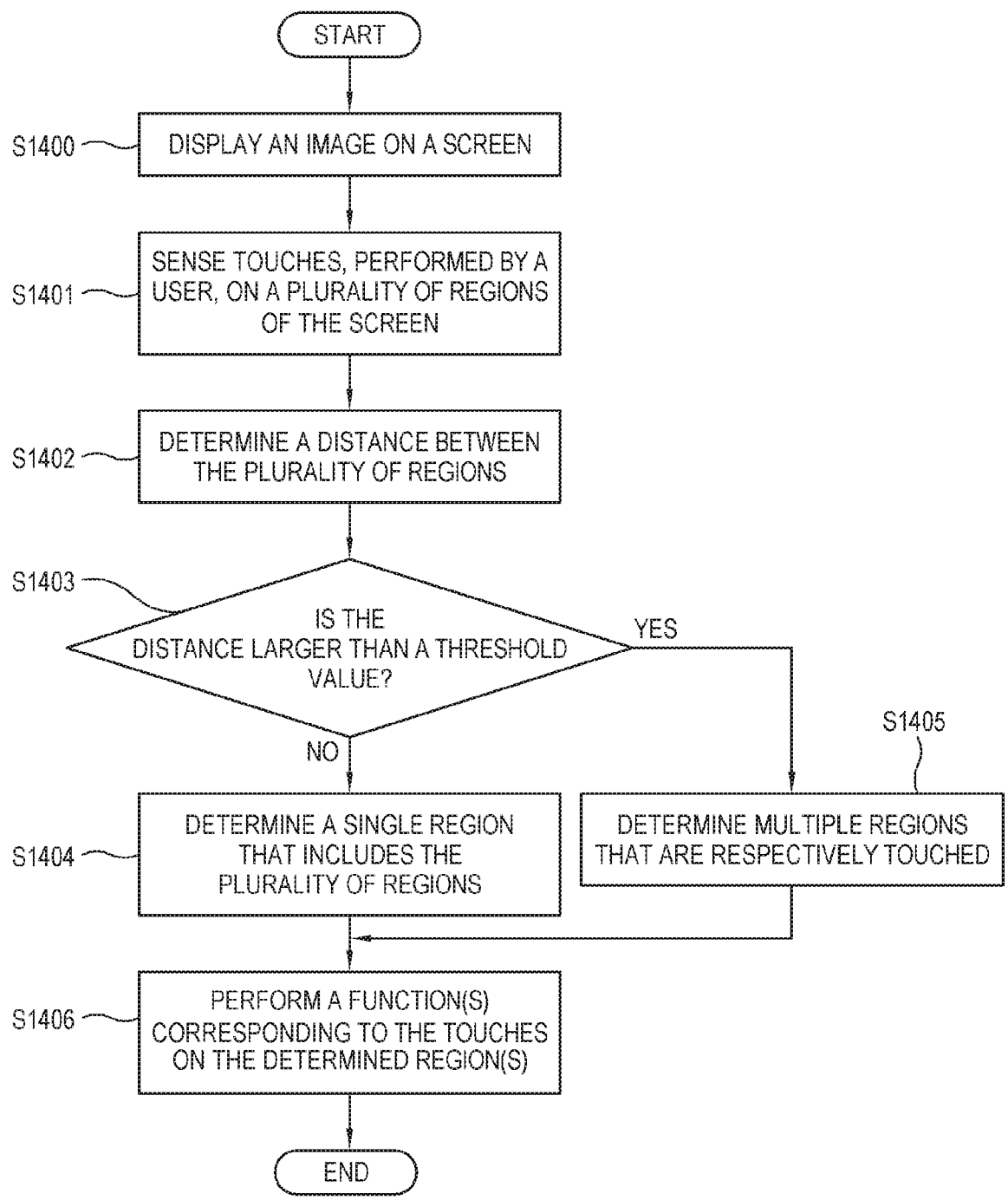
FIG. 14 is a flowchart of example operations performed by an electronic apparatus according to an embodiment.

FIG. 14 is a flowchart of example operations performed by an electronic apparatus according to an embodiment. At operation S1400, the controller 209 displays an image on a screen. At operation S1401, the touch sensor 211 senses touches, performed by a user, on a plurality of regions of the screen. At operation S1402, the controller 209 determines a distance between the plurality of regions based on the touches being sensed on the plurality of regions. At operation S1403, the controller 209 determines whether the determined distance between the plurality of regions is larger than a threshold value. For example, the controller 209 may determine whether the distance satisfies the first threshold value as described elsewhere herein. In the situation where the controller 209 determines that the distance does not satisfy the threshold value (S1403—NO), at operation S1404 the controller 209 determines that the touches correspond to a single region including the plurality of regions. In other words, the controller 209 determines a single region, that includes the plurality of regions, that is to be used to perform a function. Alternatively, in the situation where the controller 209 determines that the distance satisfies the threshold value (S1403—YES), at operation S1405 the controller 209 determines multiple regions that are respectively touched. That is, the controller 209 determines that the plurality of regions are respectively touched, and determines multiple regions that are to be used to perform a function(s). At operation S1406, the controller 209 performs a function(s) corresponding to the touches on the determined region(s).

As described above, an embodiment provides an electronic apparatus, improved in usability by recognizing a touched region to match with a user's intention, and a control method thereof.

Some embodiments herein are described in connection with thresholds. As used herein, satisfying a threshold may refer to a value being greater than the threshold, more than the threshold, greater than or equal to the threshold, less than the threshold, fewer than the threshold, lower than the threshold, less than or equal to the threshold, equal to the threshold, etc.

Although a few embodiments have been shown and described herein, it should be appreciated by those skilled in the art that changes may be made to these embodiments without departing from the principles and spirit of the disclosure, the scope of which is defined in the appended claims and their equivalents.

What is claimed is:

1. An electronic apparatus comprising:
   a display comprising a screen for displaying an image;
   a touch sensor configured to sense touches of a user on the screen; and
   a controller configured to:
   perform an erase function based on a moving path of each touch of the touches being in a same direction and a distance between the touches being less than a first threshold value, and
   perform drawing functions respectively corresponding to the touches based on the moving path of each touch of the touches not being in the same direction or the distance between the touches being greater than the first threshold value.

2. The electronic apparatus according to claim 1, wherein the controller is further configured to perform either the drawing functions corresponding to the touches, or the erase function corresponding to the touches, based on moving speeds corresponding to the touches.

3. The electronic apparatus according to claim 1, wherein the controller is further configured to provide guide information for receiving another touch of the user, through the display in a test mode, and change the first threshold value based on the other touch and based on providing the guide information.

4. The electronic apparatus according to claim 3, wherein the guide information identifies a type of the other touch to be performed by the user.

5. The electronic apparatus according to claim 3, wherein the controller is further configured to provide a user interface that permits the user to input information identifying an intention of the other touch, and change the first threshold value based on the information identifying the intention of the other touch.

6. The electronic apparatus according to claim 1, wherein the controller is further configured to provide a user interface that permits the user to identify directions of the touches and the distance between the touches.

7. The electronic apparatus according to claim 6, wherein the controller is further configured to change the first threshold value based on an input, by the user, identifying the directions of the touches and the distance between the touches.

8. A method of controlling an electronic apparatus, the method comprising:
   displaying an image on a screen;
   sensing touches of a user on the screen of a display of the electronic apparatus;
   performing an erase function based on a moving path of each touch of the touches being in a same direction and a distance between the touches being less than a first threshold value; and
   performing drawing functions respectively corresponding to the touches based on the moving path of each touch of the touches not being in the same direction or the distance between the touches being greater than the first threshold value.

9. The method according to claim 8, further comprising performing either the drawing functions corresponding to the touches, or the erase function corresponding to the touches, based on moving speeds corresponding to the touches.

10. The method according to claim 8, further comprising:
    providing guide information for receiving another touch through the display in a test mode; and
    changing the first threshold value based on a touch input, by the user, based on the guide information.

11. The method according to claim 10, wherein the guide information identifies a type of the other touch to be performed by the user.

12. The method according to claim 10, further comprising:
    providing a user interface that permits the user to input information identifying an intention of the other touch; and
    changing the first threshold value based on providing the guide information and receiving the information identifying the intention of the other touch.

13. The method according to claim 8, further comprising providing a user interface that permits the user to identify directions of the touches and the distance between the touches.

14. The method according to claim 13, further comprising:
    changing the first threshold value based on an input, by the user, identifying the directions of the touches and the distance between the touches.

\* \* \* \* \*